United States Patent [19]

Léorat et al.

[11] Patent Number: 4,599,917
[45] Date of Patent: Jul. 15, 1986

[54] RATIO CHANGE CONTROL IN AN AUTOMATIC TRANSMISSION WITH STEPPED RATIOS

[75] Inventors: Francois Léorat, Versailles; Gerard Pannier, Neauphle le Chateau, both of France

[73] Assignee: Regie Nationale des Usines Renault, Boulogne-Billancourt, France

[21] Appl. No.: 606,225

[22] Filed: May 2, 1984

[30] Foreign Application Priority Data

May 2, 1983 [FR] France .................. 83 07277

[51] Int. Cl.⁴ .................................................. B60K 41/08
[52] U.S. Cl. ...................................... 74/866; 74/870; 74/864
[58] Field of Search ............... 74/862, 863, 864, 865, 74/866, 752 D, 870; 364/424.1

[56] References Cited

U.S. PATENT DOCUMENTS

| | | | |
|---|---|---|---|
| 3,766,048 | 12/1973 | Enomoto | 74/866 |
| 4,233,862 | 11/1980 | Richard | 74/866 |
| 4,258,591 | 3/1981 | Eckert et al. | 74/866 |
| 4,282,780 | 8/1981 | Totani et al. | 74/866 |
| 4,319,501 | 3/1982 | Sugimoto | 74/866 |
| 4,324,153 | 4/1982 | Sugimoto et al. | 74/866 |
| 4,490,790 | 12/1984 | Shinoda | 74/866 X |
| 4,501,171 | 2/1985 | Muller | 74/866 |

FOREIGN PATENT DOCUMENTS

| | | | |
|---|---|---|---|
| 0038083 | 10/1981 | European Pat. Off. | |
| 2076715 | 10/1971 | France | |
| 0054848 | 3/1984 | Japan | 74/866 |
| 0040051 | 3/1984 | Japan | 364/424.1 |

*Primary Examiner*—Allan D. Herrmann
*Assistant Examiner*—Stephen B. Andrews
*Attorney, Agent, or Firm*—Oblon, Fisher, Spivak, McClelland & Maier

[57] ABSTRACT

Automatic transmission with stepped ratios for vehicle, characterized in that it comprises a system inhibiting untimely changes to the higher ratio, which system is arranged so that, on the one hand it generates a negative acceleration curve (3) located mainly below the up shift (1) and down shift (2) curves and an increasing throttle opening curve (4) located slightly above the negative acceleration curve and, on the other hand, it only enables the shift up to the higher ratio if the value of the opening ($\alpha c$) settles down, i.e. stops varying for a minimum time and if the corresponding configuration point in the plane of the vehicle speeds and throttle openings lies either between the up shift curve (1) and the negative acceleration curve (3) if the opening varies in the decreasing direction, or between the increasing opening curve (4) and the up shift curve (1) if the opening varies in the increasing direction.

3 Claims, 3 Drawing Figures

RATIO CHANGE CONTROL IN AN AUTOMATIC TRANSMISSION WITH STEPPED RATIOS

BACKGROUND OF THE INVENTION

1. Field of the Invention

The invention relates to automatic vehicle transmissions with stepped ratios.

2. Discussion of the Background

In most automatic transmissions with stepped ratios the changes of ratio in automatic operation are decided in accordance with criteria that notably include taking into account the speed of the vehicle and the engine loading. More often than not these criteria are translated into the form of ratio change laws which are conveniently visualized in the Vv/αc coordinate plane where Vv designates the vehicle speed and αc the opening of the member regulating admission of fuel to the engine. It is constantly the case that these laws are defined in such a way that the ratio changes are made at higher vehicle speeds the higher the engine loading. Furthermore, and also constantly, the N−1/N change, i.e. shifting up from a lower ratio to a higher ratio, is performed for the same engine load, or more exactly for the same αc opening at a speed which is significantly higher than the speed at which the reverse change N/N−1, i.e. the down shift, takes place. This arrangement, which can be considered as a hysteresis effect, is designed to prevent an unacceptable tendancy to hunt between the N−1 and N ratios which would be bound to occur if the up and down shift were performed under the same speed and load conditions.

As an example FIG. 1 shows a typical set of speed change laws for a three-ratio automatic transmission. A look at this diagram shows that the corresponding change laws are insufficient and unsuitable in certain configurations although they are very commonly met when driving an automobile. If, for example, we consider a vehicle in an acceleration phase in second with a virtually constant accelerator position αc, in FIG. 2 this phase is shown by a segment oriented as AB. If we now assume that at point B the driver is forced to suddenly lift his foot off the accelerator this operation appears in this same FIG. 2 as the straight line segment BC, roughly vertical if the release of the accelerator is so fast that the vehicle speed has no time to fall. It can then be seen that if path BC crosses the ⅔ change curve the transmission goes automatically into third. But in most cases this ratio change is quite inopportune, since the engine braking of the vehicle is diminished by the change into third even though the driver explicitly expressed his intention to slow down by quickly lifting his foot off. All drivers of vehicles fitted with this automatic transmission know this typical behaviour well and generally complain about it. In certain cases resorting manually to imposed speed positions enables this defect to be remedied in part but, by definition, it does not involve automatic intervention of the transmission control system and also, in an emergency the driver does not have the material time available to use the imposed positions.

SUMMARY OF THE INVENTION

The purpose of this invention is to avoid this serious shortcoming, i.e. to eliminate untimely N−1/N changes as they have just been described, while still retaining the normal change laws which generally are satisfactory in normal driving conditions, and while still allowing a harmonious return to the use of these same laws when the circumstances which caused them to be given up according to the invention have disappeared.

The invention consists in combining with each pair of normal down and up shift curves a negative acceleration curve located for the most part below the above curves and an increasing opening curve located slightly above the negative acceleration curve, and in only allowing the up shift into the upper ratio corresponding to this pair of curves if the opening variation settles down, either in the decreasing direction between the up shift curve and the negative acceleration curve, or in the increasing direction between the increasing opening curve and the up shift curve.

BRIEF DESCRIPTION OF THE DRAWINGS

Other features of the invention will appear from the following description of an embodiment taken as an example and shown in the appended drawing in which:

In FIG. 1 the speed of the vehicle Vv has been plotted along the abscissa and the opening angle αc of the gas throttle or similar member has been plotted along the ordinate. Successively from left to right can be seen the 2/1 curve for the down shift into first, the 1/2 curve for the up shift into second, the 3/2 curve for the down shift into second and the 2/3 curve for the up shift into third, assuming that the gearbox has three ratios, which is quite usual in the case of an automatic gearbox combined with a torque converter.

Figure 1:
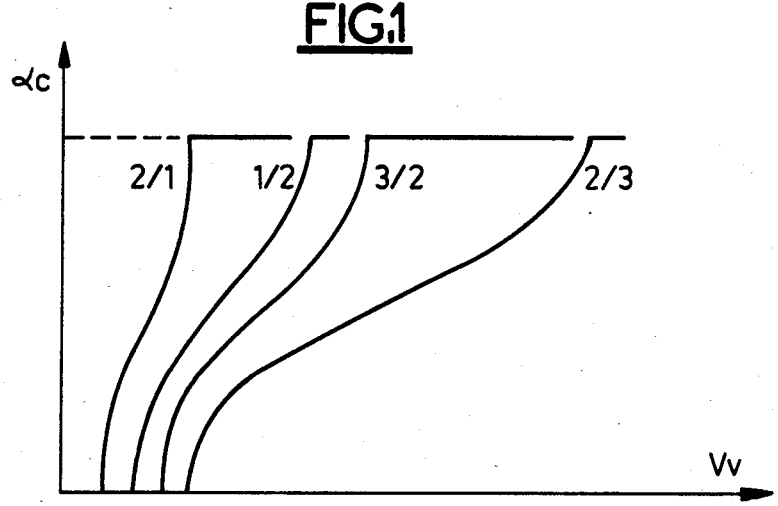
FIG. 1 shows the state of the art, i.e. the usual change curves in the up direction and in the down direction for a gearbox with three ratios.
Figure 2:
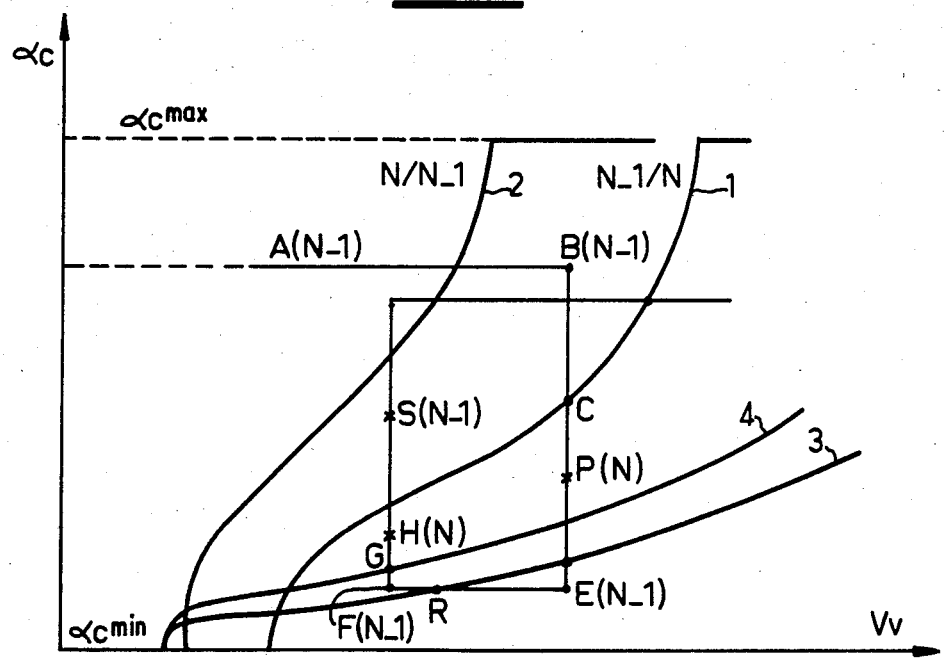
FIG. 2 shows the characteristic curves for application of the invention and for one of the changes.

More generally, and for a transmission comprising a greater number of ratios than three, we have shown in FIG. 2 the curve 1 for up shift from a ratio N−1 to the N ratio, and the curve 2 for a change down or down shift from the N ratio to the N−1 ratio. These curves are obtained by known technology: hydraulic, electro-mechanical, electronic or microprocessing.

Using a same technology, according to the invention, an additional law is used which is manifested in the plot of a so-called negative acceleration curve 3 and an increasing opening curve 4. The negative acceleration curve 3 is defined non-restrictively by the fact that any figurative point on the coordinate plane located below this curve 3 corresponds to a negative acceleration of the vehicle on the N ratio and that, therefore, any figurative point located above this curve corresponds to a positive acceleration on this same ratio. If necessary this curve can be deformed towards the low speeds so that the negative acceleration zone englobes the foot of the down shift curve 2.

The increasing opening curve 4 as defined from curve 3 by the fact that it must lie above it and close to it but sufficiently far away to prevent a hunting phenomena, as will be seen later. As a non-restrictive example curve 4 can be worked out from curve 3 by applying a simple ratio relationship of slightly more than 1 to the Vv axis, curves 3 and 4 becoming identical for a value of 1 of the relationship ratio.

If the vehicle is considered in an acceleration phase on ratio N−1 represented by segment AB, and if at B the driver suddenly lifts his foot off the accelerator, the path representing the operation in the coordinate plane cuts curve 1 at C. The crossing of the up shift curve 1 is then memorized, but the N−1/N change which should normally take place is inhibited according to the invention so long as the accelerator has not reached a stable position, i.e. so long as αc has not kept a constant value for a given time. If the accelerator reaches a stable position P located between the up shift curve 1 and the negative acceleration curve 3, the interdiction of the N−1/N change is confirmed and the vehicle stays on the N−1 ratio.

This procedure means that if the driver simply wishes to moderate the acceleration of his vehicle he raises his foot a moderate distance to point P, and he has no reason to prevent the change to the N ratio which allows the vehicle to retain a moderate acceleration on this ratio. If, on the contrary, the driver wishes to interrupt the acceleration of his vehicle he raises his foot a long way to point E, and then sufficient engine braking must be retained to prevent the change to the higher ratio which would normally occur after curve 1 is crossed.

From a situation like the one represented by point E on the N−1 ratio it is assumed that, after a deceleration phase ER, the driver reaccelerates from point F. The crossing of curve 3 at R must in no case lead to a change to the N ratio. On the contrary it is the increasing opening curve 4 which delimits the boundary of suppression of inhibition of the N−1/N change; the offset between curves 3 and 4 introduces a hysteresis effect which is similar in its principle to the one introduced by the offset of the up shift and down shift curves 1 and 2.

If, after crossing curve 4 at G, the point representing operation settles down at H, representing an accelerator position corresponding to the area lying between the increasing opening curve 4 and the up shift curve 1, the change to the higher ratio is enabled. If, on the other hand, the point representing operation settles down at S representing an accelerator position corresponding to the whole of the area located above the N−1/N up shift curve, the vehicle stays on the lower ratio N−1 so long as the representative point does not again cross the up shift curve of the normal law.

This procedure for return to the normal change law means that if the driver, on ratio N−1, reaccelerates too little for the vehicle to get into a positive acceleration on ratio N, the inhibition is maintained and the vehicle stays on the ration N−1. However, if the driver, on ratio N−1 reaccelerates moderately but enough for the vehicle to get into a positive acceleration on ratio N, there is no reason to defer the N−1/N change. The hysteresis introduced by the offset of curves 3 and 4 prevents any risk of hunting between the N−1 and N ratios. If, on the other hand, the driver reaccelerates hard enough for the point representing the vehicle's operation to be such that, conforming to the normal speed change laws, this point corresponds to operation on the N−1 ratio, the normal change laws are then allowed to operate and the N−1/N change is only enabled when the N−1/N curve is crossed normally by the representative point.

To sum up the above it can be said that the invention adds to the habitual change laws, and to the corresponding system, inhibition laws and a corresponding inhibition system which only enable the shift up to a higher ratio (N−1/N):

if the value of the opening is steady, i.e. it stops changing for a given period of time, and if the corresponding configuration in the Vv/αc plane is in the decreasing opening direction between the up shift curve 1 and the negative acceleration curve 3, or in the increasing opening direction between the increasing curve 4 and the up shift curve 1.

As mentioned above the usual technologies for implementing the normal speed change laws enable these additional laws and system to be easily adapted.

As a non-restrictive example, we shall show the adaptation of the invention to a particular technology which is that described in French Pat. No. 317 442 filed Mar. 19, 1964, with its additions 88 608 and 90581, Patent No. 1 520 662 filed Feb. 8, 1967 and particularly Patent No. 70 02585 filed Jan. 26, 1970.

Figure 3:
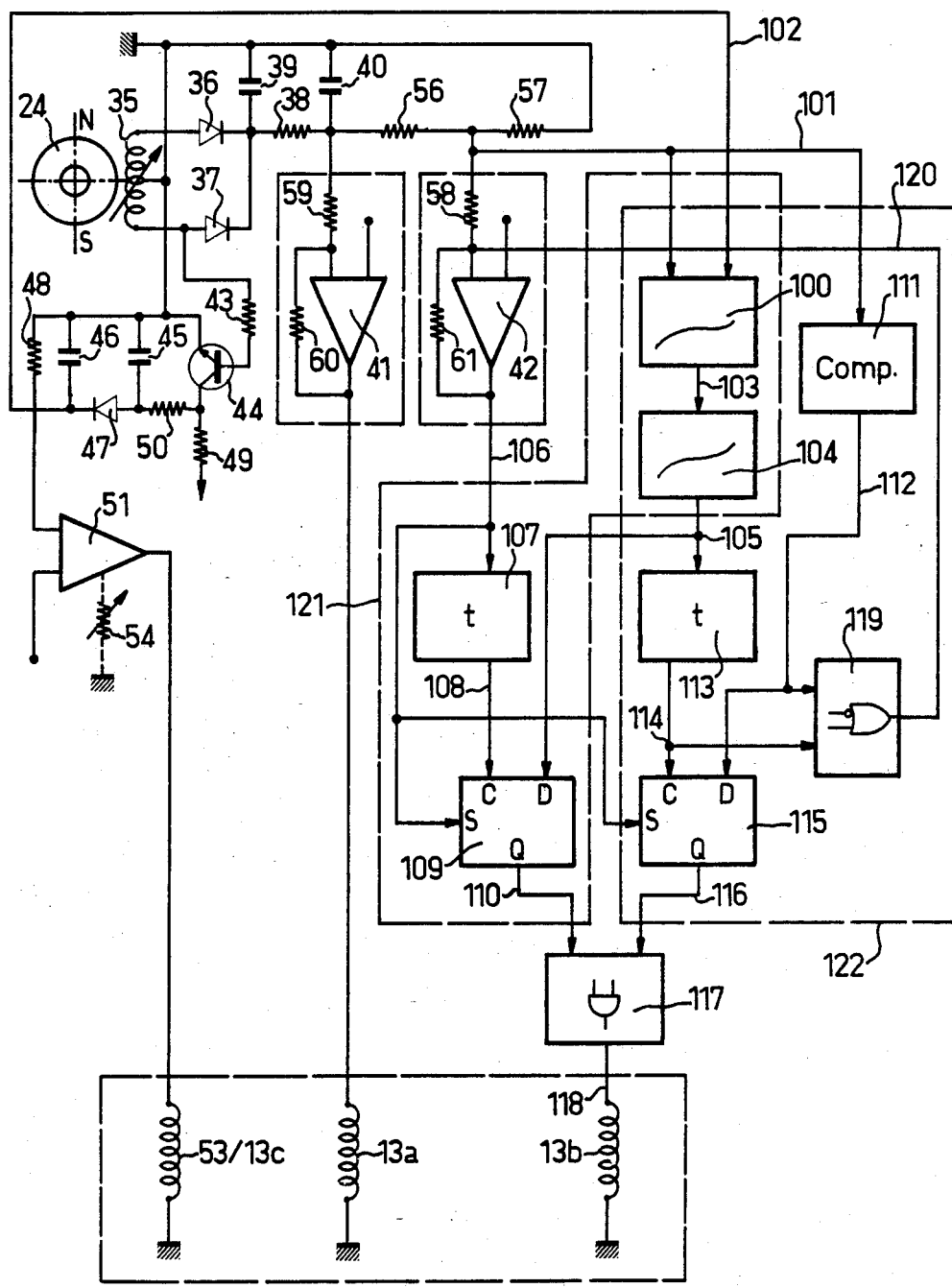
FIG. 3 shows the schematic of a particular embodiment of the invention.

Indeed, FIG. 3 in the present application repeats FIG. 4 of this patent 70 02 585 simply adding those elements which allow the invention to be applied as it has just been specified.

For purposes of simplification, components which fulfil the same functions common to FIG. 3 of this application and FIG. 4 of the above-mentioned patent retain the same two-digit numbering while the extra elements enabling the invention to be applied are marked with three-digit numbers.

The second or third transmission ratios are normally controlled by means of an electrically-operated valve 13b. The system operating logic is designed so that the presence of current in the electric valve 13b corresponds to the second speed, while the absence of current corresponds to the third speed. The electric valve 13b is controlled by the output lead 118 from the power amplifier gate 117 which performs both logical combination of the states of the law 121 controlling the changes from the second to the third ratio and the law 122 controlling the changes from the third to the second ratio and also power amplification of the logic signals from the two control channels 121 and 122 to provide the correct power supply to the electrically-operated valve 13b.

The components shared by the two channels 121 and 122 consist of the functional units 100 and 104 which generate curve 5 in FIG. 2 bounding the vehicle's positive acceleration necessary for locking in the second ratio when the driver lifts the foot off the accelerator pedal and curve 4 in FIG. 2, related to curve 3, and which delimits the boundary of suppression or maintenance of the second ratio for increasing openings, i.e. when the driver presses the accelerator pedal down.

The mixing circuit 100 generates, from the combined image voltage of the engine loading αc and the vehicle speed Vv present on lead 101 and the image voltage alone of the vehicle speed Vv present on lead 102, a transposed voltage present on lead 103 and combining differently the vehicle speed Vv and engine load αc parameters so that the comparison of its value with a fixed threshold through the voltage comparator 104 with hysteresis generates the curves 3 and 4 of FIG. 2 in the αc/Vv space. The voltage of lead 101 is supplied by the double coil 35 of the comparator governor at the common point of resistors 56 and 57 of the dividing bridge after rectification by diodes 36, 37 and filtering by the cell formed by capacitors 39, 40 and resistor 38. The voltage of lead 102 is supplied by the converter formed by elements 43 to 50 which convert the frequency variations in the double coil 35 linked to the vehicle speed into a voltage variation at the terminals of resistor 48.

The unit 121 consists of a memorizing multivibrator 109 whose output Q takes on and keeps the state of the read input D only when the control input C changes state and goes from logic level 0 to logic level 1. Input D is connected to the output lead 105 of the fixed threshold comparator 104 whose state is representative of the position of the vehicle operating point ($\alpha c/Vv$) with respect to curves 3 and 4 in the space defined by FIG. 2. The logic state of lead 105 is 0 when the operating point is located on the left of curve 4 and 1 when the operating point is on the right of curve 3. In the hysteresis zone lying between the two curves 3 and 4 lead 105 can take on states 0 or 1 depending on which way the operating point moves. It retains the 0 level when curve 4 is cut from left to right and up to curve 3; on the other hand it retains the 1 level when curve 3 is cut from right to left as far as curve 4. The C input of the multivibrator 109 is connected to output lead 108 from the timing until 107 which is charged with delaying the appearance of the second-to-third speed change signal.

The unit 122 consists of a memorizing multivibrator 115 working on the same principle as 109. The D input to multivibrator 115 is connected to output lead 112 from the fixed threshold comparator having virtually zero hysteresis 111 which compares the combined image voltage of the engine load $\alpha c$ and the vehicle speed Vv with a fixed threshold, and whose output state represents the vehicle operating point position with respect to curve 1 in the space defined by FIG. 2. The logic level of lead 112 is 1 when the operating point is located on the left of curve 1 and 0 when the operating point is on its right. The C input of multivibrator 115 is connected to output lead 114 from the timing unit 113 which works on the same principle as 107 and which is charged with delaying the appearance of the signal indicating that curve 4 in FIG. 2 is being crossed from left to right by the vehicle operating point.

The two inputs 5 returning the outputs of multivibrators 109 and 115 to the 1 state and connected to lead 105 and enable multivibrators 109 and 115 to be returned to the initial state and thus send current to the electrically-operated valve 13b via the power gate 117 corresponding to the second transmission ratio, when the vehicle operating point is located on the left of curve 2 in FIG. 2 and when the comparator unit 42, 58, 61 raises lead 106 to level 1.

Finally, gate 119 which receives the output signal from comparator 111 via lead 112 and the output signal from the timing unit 113 via lead 114, and which is connected by lead 120 to the common point of resistors 58, 61 and one of the inputs to amplifier 42, enables output 106 of amplifier 42 to be placed in the state corresponding to the second transmission ratio for certain logical combinations of the state of leads 112 and 114 which will be explained later.

If we first consider the vehicle in an acceleration phase on the second ratio, represented by segment AB of FIG. 2, the output from the comparator formed by amplifier 42 and by resistors 58 and 61 is at logic level 1 and through lead 106 which arrives at the S inputs of multivibrators 109 and 115 it makes the Q outputs of multivibrators 109 and 115 remain at the 1 level. Leads 110 and 116 convey these 1 levels to the two inputs of the power gate 117 which, in these conditions, feeds current via lead 118 to the electric valve 13b and imposes the second speed. Also in this case the mixing 100 and comparator 104 circuits which monitor the position of the operating point with respect to curves 3 and 4 in FIG. 2 supply a signal in the 0 state on lead 105.

At point B in FIG. 2 the driver lifts his foot off the accelerator pedal. When the vehicle's operating point cuts curve 1 at C, output lead 106 from the comparator formed by amplifier 42 and resistors 58 and 61 changes logic state and quickly goes over from level 1 to level 0. After a time generated by the timing until 107, lead 108 sees its level change quickly from 0 to 1. This change in the state of lead 108 controls the reading and holding of the Q output of the logic level present on the D input of the memorizing multivibrator 109. Two cases may then arise:

either the driver gently lifts his foot from the accelerator or moves the pedal slightly so that the operating point arrives, for example, at point P in FIG. 2, not having had the time to cross curve 3 generated by the mixing circuit 100 and comparator 104. In this case lead 105 connected to the output of comparator 104 and input B of multivibrator 109 remain at logic level 0; on arrival of the control command on input C of the multivibrator 109 the Q output changes state and the lead 110 sets up a 0 logic level on the power gate 117 which cuts off the feed to the electric valve 13b via lead 118 and produces the third transmission ratio shift;

or the driver quickly lifts his foot and moves the accelerator pedal a long way so that the operating point arrives, for example, at point B and has had the time to cross curve 3. In these conditions lead 105 connected to the output from the comparator circuit 104 has changed from logic level 0 to level 1 at the instant when the operating point has cut curve 3, and this well before the change in state of lead 108. The arrival of the control command on input C maintains the Q output of multivibrator 109 in the 1 state. The state change of lead 105 is also transmitted to the timing unit 113 which does not insert any delay in these conditions. The output from 113 connected by lead 114 to the C control input of multivibrator 115, which quickly changes from level 1 to level 0 virtually at the same time as input 213 rises from 0 to 1, has no effect on multivibrator 115, which is active only when its C input changes from level 0 to 1. The Q output of 115 connected to lead 116 therefore remains at level 1. The two leads 110 and 116 therefore still send the two 1 levels to the inputs of the power gate 117 which continues to supply current to the electric valve 13b and holds the second transmission ratio.

We now return to the first case set forth above when the operating point of the vehicle has only arrived at point P after a time delay produced by unit 107, and when the transmission has changed to the third ratio. This situation corresponds to the known normal operation of automatic gearboxes and control channel 122, which only acts to suppress the action of control channel 121 via lead 116 blocking in second, has no effect on the power gate 117 and therefore has no effect on the state of electric valve 13b so long as the input is connected to the output lead 110 from control channel 121 which has remained at level 0. This state exists until, with the operating point going from the right to the left of curve 2 in FIG. 2, the logic level of the output lead 106 of the comparator formed by amplifier 42 and the two resistors 58 and 61 rises rapidly from the 0 level to the 1 level. This change in state of the S input connected to lead 106, by putting the Q output of multivibrator 106 back to 1, raises lead 110, the output from the power gate 117 and lead 118 to level 1 corresponding to engagement of the second transmission ratio by supplying electrically-operated valve 13b.

In the second case set forth above the vehicle operating point has reached point E in FIG. 2 following the time delay produced by unit 107; through output lead 110 from control unit 121 and through output lead 116 from control unit 122, which have stayed at level 1, the transmission has kept the second speed. After a deceleration phase represented by segment EF of FIG. 2, where the crossing of curve 3 at R has no effect, the driver again presses the accelerator pedal. At point G, which corresponds to the crossing of curve 4 from right to left, the output connected to lead 105 of the mixing 100 and comparator 104 circuits quickly changes from logic level 1 to level 0. After a period of time generated by the timing unit 113, which can be set to be different or equal to the delay produced by the other timing unit 107, lead 114 sees its level change rapidly from 0 to 1. This change in the state of lead 114 controls the reading and the holding by the Q output of the logic level present on the B input of the memorizing multivibrator 115. Two cases may then arise:

either the driver presses the accelerator down gently or moves the pedal only slightly, so that the operating point arrives, for example, at point H in FIG. 2 without crossing curve 1 generated by comparator 111. In this case wire 112 connected to the output from comparator 111 and to the D input of multivibrator 115 remain at logic level 0 and, on the control command on the C input of multivibrator 1 the Q output changes state and lead 116 brings a 0 logic level to the power gate 117 which, via lead 118, cuts off the feed to the electric valve 13b and causes the change to the third transmission ratio;

or the driver presses the accelerator quickly and moves the pedal a long way so that the operating point arrives, for example, at point S having had the time to cross curve 1. In these conditions lead 112 connected to the output of comparator circuit 111 has changed from logic level 0 to level 1 when the operating point has cut curve 1, and this before the change in state of lead 114. The arrival of the control command on the C input maintains the Q output of multivibrator 115 and lead 116 in state 1. The two leads 110 and 116 therefore still send the two 1 levels to the inputs of the power gate 117 which continues to supply the electrically-operated valve 13b with current and maintains the second transmission ratio.

The circuit formed by gate 119 is the one that is responsible for putting the comparator formed by amplifier 42 and resistors 58 and 61 back into the state corresponding to the second transmission ratio to permit normal operation of the electronic drive with the possibility of adopting the third ratio when the operating point recrosses curve 1. The output of gate 119 transiently drops off by applying via lead 120 a 0 level to the common point of resistors 58, 61 and one of the inputs of amplifier 42, only when lead 112 is in the 1 state and lead 114 is in the 0 state. This configuration, which flips into state 1 the output connected to lead 106 of amplifier 42 corresponding to the position of the operating point situated to the left of curve 1, only exists transiently, since it stops after a certain time generated by the timing unit 113, only when there is confirmation of the holding of the second ratio after blocking caused by lifting the foot off, then suddenly pressing the accelerator pedal back down again.

Naturally, one versed in the art will have no difficulty in adapting the invention to any other technology than the electronic technology described with reference to French patent application No. 80 07584.

We claim:

1. In an automatic transmission with stepped ratios for a vehicle of the type wherein a governor generates, for each transition between two successive ratios, namely a lower ratio and a higher ratio, an up shift curve and a down shift curve of the transmission ratio in a plane of throttle openings and vehicle speeds and produces either the change to said higher ratio when a point representing the operation crosses, through increasing speed or decreasing throttle speed, the up shift curve, or the change to said lower ratio when the representative point crosses the down shift curve in the direction of decreasing speeds or increasing throttle openings with, for at least one transition, a system inhibiting untimely changes into said higher ratio, the improvement wherein said system is arranged so that a negative acceleration curve is first generated which is located at least for medium and high vehicle speeds below the up and down shift curves and an increasing opening curve located slightly above the negative acceleration curve and wherein said system only enables the change up to said higher ratio of the value of the opening stops changing for a minimum time and if said representative point in said plane lies either between the up shift curve and the negative acceleration curve if the throttle opening varies in the decreasing direction, or between the increasing opening curve and the up shift curve if the throttle opening varies in the increasing direction.

2. The transmission according to claim 1 wherein the negative acceleration curve crosses both said up and down shift curves for lowest vehicle speeds and reaches a point of minimum throttle opening at a speed curve lower than the downshift curve.

3. The transmission according to claim 2 wherein the increasing throttle opening curve is defined as a related curve of the negative acceleration curve related with respect to the speed axis in a ratio which is slightly greater than one.

* * * * *